United States Patent
Weisbecker

(10) Patent No.: US 9,701,860 B2
(45) Date of Patent: Jul. 11, 2017

(54) PRINTABLE RADIATION CURABLE BARRIER COATINGS

(71) Applicant: SUN CHEMICAL CORPORATION, Parsippany, NJ (US)

(72) Inventor: Carl Weisbecker, New York, NY (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 14/765,876

(22) PCT Filed: Feb. 12, 2014

(86) PCT No.: PCT/US2014/015940
§ 371 (c)(1),
(2) Date: Aug. 5, 2015

(87) PCT Pub. No.: WO2014/130311
PCT Pub. Date: Aug. 28, 2014

(65) Prior Publication Data
US 2016/0009939 A1    Jan. 14, 2016

Related U.S. Application Data

(60) Provisional application No. 61/766,240, filed on Feb. 19, 2013.

(51) Int. Cl.
| | |
|---|---|
| *C09D 133/08* | (2006.01) |
| *C09D 191/06* | (2006.01) |
| *C09D 4/06* | (2006.01) |
| *C09D 133/10* | (2006.01) |
| *C08K 5/05* | (2006.01) |
| *B41M 7/00* | (2006.01) |
| *D21H 19/18* | (2006.01) |
| *D21H 19/20* | (2006.01) |
| *D21H 19/16* | (2006.01) |
| *D21H 19/82* | (2006.01) |
| *D21H 19/84* | (2006.01) |
| *D21H 21/16* | (2006.01) |

(52) U.S. Cl.
CPC ......... *C09D 133/08* (2013.01); *B41M 7/0045* (2013.01); *C08K 5/05* (2013.01); *C09D 4/06* (2013.01); *C09D 133/10* (2013.01); *C09D 191/06* (2013.01); *D21H 19/16* (2013.01); *D21H 19/18* (2013.01); *D21H 19/20* (2013.01); *D21H 19/82* (2013.01); *D21H 19/84* (2013.01); *D21H 21/16* (2013.01)

(58) Field of Classification Search
CPC .... C09D 133/08; C09D 11/12; C09D 11/101; C09D 11/03; C09D 4/06; C09D 289/00; C08K 5/05
See application file for complete search history.

(56) References Cited

U.S. PATENT DOCUMENTS

| | | | |
|---|---|---|---|
| 6,887,640 B2 | 5/2005 | Zhang et al. | |
| 7,951,793 B2* | 5/2011 | Cheng | C07D 413/12 514/210.02 |
| 2006/0223937 A1* | 10/2006 | Herr | C08G 59/24 524/556 |
| 2007/0117917 A1 | 5/2007 | Herr et al. | |
| 2007/0120922 A1 | 5/2007 | Belelie et al. | |
| 2009/0022978 A1 | 1/2009 | Wuu | |

FOREIGN PATENT DOCUMENTS

| | | |
|---|---|---|
| JP | 2010-234596 | 10/2010 |
| WO | WO-2009/012292 A1 | 1/2009 |

OTHER PUBLICATIONS

European Search Report issued in European Application No. 14754945.5, dated Aug. 31, 2016.
International Preliminary Report issued in PCT/US2014/015940 dated Aug. 25, 2015.
International Search Report issued in PCT/US2014/015940, dated May 16, 2014.

* cited by examiner

*Primary Examiner* — Sanza McClendon
(74) *Attorney, Agent, or Firm* — Frost Brown Todd LLC

(57) ABSTRACT

This invention discloses a radiation curable barrier coating composition for application to paper or paperboard substrates that can be applied using a conventional flexographic printing process. The coating composition includes one or more hydrophobic cycloaliphatic radiation curable monomers, one or more alcohol-functional waxes or sterols, and one or more other hydrophobic wax materials. The incorporation of these materials together lowers the MVTR of the coating compared to other radiation curable compositions while also generating improved, higher gloss. This invention also discloses a method to manufacture the coating composition and a preferred method to print the coating composition.

28 Claims, No Drawings

PRINTABLE RADIATION CURABLE BARRIER COATINGS

CROSS REFERENCE TO RELATED APPLICATIONS

The present application is a §371 National Phase application based on PCT/US2014/015940 filed Feb. 12, 2014, which claims the benefit of U.S. Provisional Application Ser. No. 61/766,240, filed Feb. 19, 2013, all of which applications are incorporated herein by reference in their entirety and for all purposes.

FIELD OF THE INVENTION

The present invention relates to a printable radiation curable high gloss barrier coating composition, particularly to barrier coating composition containing an alcohol-functional wax or sterol combined with the cycloaliphatic monomers and an additional hydrophobic wax material.

BACKGROUND OF THE INVENTION

Paper and paperboard materials used in packaging applications require barrier properties to protect dry goods in the package interior from moisture in the external environment. Barrier coatings for paper substrates, which have been described in prior art, can impart water resistance, grease resistance, or chemical resistance. They can diminish water vapor transmission rates through paper. Barrier coatings can also prevent other undesired chemical migration through the substrate. These barrier coating functions are especially useful for many paper packaging applications for food and non-food packaging applications. Packaging may be required to protect dry goods and powdered materials from the ingress of moisture in humid conditions. Conversely, disposable paper cups are required to retain their liquid contents. In some cases, a barrier coating applied during the process of manufacturing the paper may be sufficient to meet these packaging requirements, but such coated materials also have limitations, which are widely understood. For instance, polyolefin based wax materials can provide effective barriers when coated or laminated on paper, but such wax coatings have low gloss, high coating weight, and impede the recyclability of the paper. The barrier treatments that are applied during paper manufacturing may also adversely affect subsequent processes, such as printing, stamping, or gluing paper packages.

Prior art also teaches examples of effective printable barrier coatings on paper that can be applied to selected areas of a package before or after printing inks onto the substrate by offset printing, flexographic printing, ink jet printing or other means. Such barrier coatings known in the art may be constructed as solvent-based coatings, water-based coatings, or 100% solid coatings. It is well known in the art that the incorporation of materials with a hydrophobic, cycloaliphatic backbone into coatings improves their intrinsic barrier properties, especially by lowering the permeability of water vapor (See for example J. M. Oliver, D. S. Babcock, "Influences on Barrier Performance of UV/EB Cured Polymers", *RadTech* 2012 *Technical Conference*). Factors thought to contribute to the performance of cycloaliphatic materials in barrier materials are (a) the hydrophobicity of the cycloaliphatic backbone containing alicyclic hydrocarbon groups (reducing water vapor solubility), (b) the high crosslink density achieved in cured materials (reducing water vapor diffusion rate), and (c) rigid alicyclic backbone structures with low segment mobility (also reducing the permeant diffusion rate).

It is also well known that hydrophobic wax materials can be incorporated into barrier coatings to increase water resistance and to lower the permeability of water vapor. However, methods in prior art that teach this use of hydrophobic wax materials do not address the dull surface appearance and low gloss that accompanies their use when incorporated into coating compositions. The appearance and gloss of radiation curable coatings is related to the poor solubility and crystallinity of hydrophobic wax materials. Wax materials typically fail to form solutions or homogeneous dispersions in the coating matrix. Poorly compatible wax materials accumulate at the coating surface where they form crystals and amorphous aggregates that diminish the specular reflection contributing to gloss. Low refractive indices of hydrophobic wax materials also cause a diminishment of coating gloss.

Gloss is an important, highly desired property of radiation curable coatings for paper packaging applications. A clear coating with a high level of gloss makes underlying printed images appear more distinct and colorful. The achievement of high gloss is enabled by the high solid level in radiation curable coating, which may approach 100 wt. % of nonvolatile solids. The high solid level contributes to the ability of radiation curable coatings to form a continuous coating with a smooth surface on top of the paper surface. It may be highly desirable for some applications related to paper packaging to design radiation curable coatings that function in a dual role as a both a barrier coating and a gloss coating. The incorporation of hydrophobic waxes to lower MVTR of the coating forces a trade-off between barrier performance and gloss.

The prior art discloses other barrier coatings that contain water or organic solvents. These other coating types require drying capability on the printing press to remove the water or solvents from the printed coating. The generation of volatile organic compounds from solvents in the printing process is also regulated and restricted by environmental standards in some places. The absence of water or volatile solids in the coating of the present invention is a technical advantage. Some of the of barrier materials containing water or organic solvents also are incapable of being applied to paper or paperboard in a conventional flexographic printing process because they may lack appropriate rheology or chemistry that would be compatible with the flexographic printing process. The coatings of the present invention can be applied selectively to areas of substrate that require it; whereas these other barrier materials must be applied uniformly all over the paper or paperboard. The printable barrier coatings of the present invention can be applied over printed inks or surface features that may be produced on the substrate surface during construction of a paper package. Printability is an important technical advantage.

The prior art also discloses hot-melt barrier and molten wax barriers, which need not contain any water or volatile solvents; however, these types of coatings are solid materials at room temperature. They must be heated above room temperature to melt them; thus, these materials are also not compatible with a conventional flexographic printing process. The coatings of the present invention remain liquid until after printing onto the paper or paper board in selected areas and curing by actinic radiation. Hot-melt and molten wax barriers on paper may also have other deficiencies, such as low gloss, dull hazy appearance, poor adhesion, and slipperiness.

The prior art also discloses laminated polyethylene film that can be used as a barrier layer for paper packaging materials; however, the lamination process applies the barrier film uniformly all over paper or paperboard surfaces. The laminated barrier film cannot be applied selectively to the substrate in a flexographic printing process or by any other envisioned print process.

Some barrier coatings disclosed in prior art contain halogenated polymers or halogenated waxes. The halogenated coating materials have undesired environmental impact and often require special material disposal. The coating compositions of the present invention do not rely upon the use of any halogenated organic materials.

The present invention relates to a printable radiation curable high gloss barrier coating composition. The main technical advantage of this invention is discernible after the coating is printed onto the ink receptive surface of paper or paperboard and then exposed to actinic radiation. The substrate printed with this composition achieves a combination of properties, consisting of a low MVTR and high gloss, not achievable by other conventional radiation curable coatings. Prior art discloses other printable radiation curable barrier coating compositions, but none of these other compositions claim a combination of low MVTR and high gloss when printed on paper or paperboard.

The present invention describes printable barrier coating compositions for paper packaging that include the following components: one or more hydrophobic, cycloaliphatic radiation-curable monomers; one or more alcohol-functional waxes or sterols; and one or more additional hydrophobic waxes. After being printed and cured on the ink receptive surface of paper or paperboard, the printed article has a low MVTR, and the cured surface has improved and higher gloss due to the alcohol-functional material. Prior art discloses other printable barrier coating compositions that are radiation curable (e.g. WO 2012/061704, discloses a ream wrap material with a radiation curable barrier coating). Prior art also discloses compositions that contain hydrophobic, cycloaliphatic, radiation-curable monomers that are used in barrier materials (e.g. US 2007/0117917 and WO 2006/107802 describe barrier sealants for electronic materials); therefore the use of hydrophobic, cycloaliphatic monomers in barrier materials is generally known in the art. The use of hydrophobic wax materials in barrier coatings is also generally known (e.g. U.S. Pat. No. 7,915,183, describing a paraffin wax coating on paper). The unexpected discovery of this invention is that an alcohol-functional wax or sterol combined with the cycloaliphatic monomers and an additional hydrophobic wax material, when cured on paper, produces an excellent barrier coating with improved, higher gloss. High gloss is a desired property with added benefit for the paper packaging application, and the incorporation of hydrophobic wax material typically diminishes gloss. This invention discloses the use of an alcohol-functional wax or sterol to increase the gloss of the barrier coating.

SUMMARY OF THE INVENTION

The present invention provides a coating composition comprising:
 (a) 40% or more of one or more hydrophobic cycloaliphatic monomer(s);
 (b) from 0.1% to 10% of one or more alcohol-functional wax(es) or sterol(s); and
 (c) from 0.1% to 10% of one or more hydrophobic wax material(s),
wherein, said coating composition is a printable radiation curable barrier coating composition.

The present invention also provides a printing process comprising printing the barrier coating composition of the present invention to a paper or paperboard substrate.

The present invention further provides a printed substrate comprising the barrier coating composition of the present invention.

The present invention also provides a process for manufacturing the barrier coating composition of the present invention comprising heating together the hydrophobic cycloaliphatic monomer, the alcohol-functional wax or sterol, and the hydrophobic wax material to a temperature of up to 80° C. to facilitate blending and mixing of wax components into the coating composition.

These and other objects, advantages, and features of the invention will become apparent to those persons skilled in the art upon reading the details of the methods and formulations as more fully described below.

DETAILED DESCRIPTION OF THE INVENTION

Definitions

For the purposes of the present invention, the terms "radiation" or "actinic radiation" refer to energy from a radiant energy source, such as high energy electrons from an electron beam source or ultraviolet (UV) light from a UV lamp.

The term "radiation curable" refers to those coatings, which comprise, at minimum, one or more radiation curable monomers. These radiation curable coatings (or radiation curable coating compositions used to provide such coatings) may also include other optional additives, such as, for example, solvents, diluents, rheology modifiers, dispersants, surfactants, leveling agents, photoinitiators, waxes, optical brighteners, inhibitors, stabilizers, defoamers, deaerators, reactive oligomers, reactive resins, inert resins, fillers, etc.

The term "radiation curable monomers" refers generally to monomers, oligomers, etc., which are energy-curable (e.g., polymerizable, crosslinkable, etc.) to provide radiation cured polymers. Radiation curable monomers used for the coating of this invention preferably are hydrophobic, cycloaliphatic monomers.

The term "cycloaliphatic" refers to a class of alicyclic organic compounds containing carbon and hydrogen atoms joined to form one or more aliphatic rings. The carbocyclic ring structure containing carbon and hydrogen atoms may be saturated or unsaturated, but the ring structure would preferably not be a benzenoid or other aromatic ring system. (See Nic, M.; Jirat, J.; Kosata, B., eds. (2006-). "Alicyclic compounds". *IUPAC Compendium of Chemical Terminology*).

The term "alcohol-functional wax" refers to a viscous non-volatile liquid or solid aliphatic alcohol with a low softening temperature, which is insoluble in water. Non-limiting examples of alcohol-functional waxes include linear solid alkanols (such as 1-hexadecanol, 1-octadecanol, or Unilin alcohols from Baker Hughes) and alcohol-functional branched polyolefins (such as Vybar H-6175). Alcohol-functional waxes useful for this invention preferably have hydroxyl values in the range of approximately 100-300 mg KOH/g.

The term "sterol" refers to any of the naturally occurring alcohol derivatives belonging to the steroid family of polycyclic hydrocarbons. Sterols contain a characteristic arrangement of four cycloalkane rings that are joined to each other. Non-limiting examples of sterols include cholesterol, ergosterol, lanosterol, estradiol, testosterone, and cycloartenol.

The term "barrier coating" refers to a coating that is protective against environmental moisture, i.e. has a relatively low water vapor transmission rate (MVTR), especially in environments having a relatively high relative humidity (RH) (e.g. about 65% or greater, more typically about 80% or greater). Barrier coatings within the scope of this invention are primarily envisioned to be clear, non-pigmented coatings suitable for overprinting, but pigments could also optionally be incorporated into the barrier coating compositions.

The term "hydrophobic" refers to organic compounds that have low water solubility or that would be expected to have low water solubility based on solubility parameters. Solubility parameters can either be measured directly by experiment or calculated using functional group contribution methods.

The term "hydrophobic wax" refers generally to a viscous non-volatile liquid or solid material with a low softening temperature, which is insoluble in water.

The term "printable" refers to a material that can be applied selectively to form an image on a paper or paperboard substrate having a print receptive surface.

The term "print receptive surface" refers to a surface which is able to absorb, imbibe, take up and accept, etc., printed ink or coating material to form one or more printed images. The print receptive layer may comprise, for example, one or more substrate pigments (e.g., clay, titanium dioxide, calcium carbonate, calcined clay, etc.), starch binder, latex binder, a lubricant (e.g., calcium stearate), optical brightening agents, etc.

The term "flexographic" (also referred to as "flexo") refers to a form, technique, method, etc., of printing that uses a flexible relief plate. Flexographic methods also use a specially designed or engraved roller (anilox roller) having a surface containing a plurality of recessed dimples or cells for receiving and transferring the printable material to the printed substrate. Flexographic methods may use highly fluid printable materials (e.g., water-based inks), specially designed polymer relief printing plates, and light pressure in the printing nip area.

The term "gloss" refers to the ability of paper to reflect some portion of the incident light at the mirror angle. Gloss may be based on a measurement of the quantity of light specularly reflected from the surface of a paper specimen at a set angle, for example, at 60°, such as in the case of 60° gloss measured at an incidence angle of 60° using a BYK Gardner micro-TRI-gloss unit.

The term "moisture vapor transmission rate" (MVTR) refers to the rate at which moisture (water vapor) passes through or is transmitted through a material, layer, substrate, etc., in units of $g/m^2/day$. The method that is used herein to determine MVTR is described in ISO method 2528 (but measured at 23° C. and 85% RH) using Gardner Permeability Cups (PO-2301). Temperature and humidity were maintained in a Nor-lake Scientific test chamber, Model NSRI241WSW.

The term "relative humidity" (RH) refers to the percentage relation between the actual amount of water vapor in a given volume of air at a definite temperature and the maximum amount of water vapor that would be present if the air environment were saturated with water vapor at that temperature. RH is typically measured herein at 23° C.

The term "paper substrate" refers to a fibrous web that may be formed, created, produced, etc., from a mixture, furnish, etc., comprising paper fibers, etc., plus any other optional papermaking additives such as, for example, internal and/or external paper sizing agents, fillers, wet-strength agents, optical brightening agents, etc. The paper substrate may be in the form of a continuous roll, a discrete sheet, etc.

The term "packaging" refers to materials for forming packages for protecting, carrying, distributing, etc., products, such as a ream of paper, paper rolls, foods, beverages, etc. Packaging material may include, for example, ream wrap, roll wrap, envelopes, containers (e.g., for foods or beverages), boxes, etc.

The term "coating weight" refers to amount of a coating, or composition used to provide such coatings, present on a given side or surface of the paper substrate or layer being coated. Surface coverage may be defined in terms of grams (of solids) of composition per square meter of paper substrate or layer (hereinafter referred to as "gsm").

The term "ink" refers to printer colorant as used by ink jet printers, flexographic printers, etc. The term ink may include dye-based inks and/or pigment-based inks. Dye-based inks comprise a dye which may be an organic molecule which is soluble in the ink medium. Dye-based inks may be classified by their usage, such as acid dyes, basic dyes, or direct dyes, or by their chemical structure, such as azo dyes, which are based on the based on an —N=N— azo structure; diazonium dyes, based on diazonium salts; quinone-imine dyes, which are derivates of quinine, etc. Pigment-based dyes comprise a pigment, which is a solid colored particle suspended in the ink medium. The particle may comprise a colored mineral, a precipitated dye, a precipitated dye which is attached to a carrier particle, etc. Inks are often dispensed, deposited, sprayed, etc., on a printable material (e.g., ink-receptive layer) in the form of droplets which then dry on the printable material to form the printed image(s).

The term "room temperature" refers to the commonly accepted meaning of room temperature, i.e., an ambient temperature of 20° to 25° C.

The term "basis weight" refers to the grammage of a sheet, roll, etc., of material comprising the paper substrate, with or without layers or coatings.

The present invention relates to a composition for a radiation curable moisture vapor barrier coating for paper or paperboard that can be applied using a conventional flexographic printing process. The coating composition includes: (a) one or more hydrophobic cycloaliphatic radiation curable monomers, (b) one or more alcohol-functional waxes or sterols, and (c) one or more hydrophobic wax materials. The alcohol-functional materials and hydrophobic wax materials are preferably both used to achieve a combination of properties including low MVTR and high coating gloss. The application also describes a manufacturing process to form the barrier coating composition. The present invention also describes processes to apply the barrier coating using a flexographic printing process. The incorporation of these materials together lowers the MVTR of the coating compared to other radiation curable compositions while maintaining high gloss.

Preferably, the amount of hydrophobic cycloaliphatic monomers in the coating composition of the present invention is greater than 60 wt. %, the amount of alcohol-functional waxes or sterols is less than or equal to 5 wt. %, and the amount of other hydrophobic wax materials is less than or equal to 5 wt. % of the total weight of the composition.

In general, the intrinsic rate of penetration of a permeant (e.g. water vapor) through a barrier material can be described by the material permeability (P), which is the product of a diffusion term (D) and a solubility term (S): P=DS. The solubility term (S) for water vapor within a barrier layer may be diminished by incorporating hydrophobic materials into a barrier coating composition. The diffusion term (D) is related to the mobility of the permeant within the barrier matrix. This permeant mobility is reduced within a radiation curable coating by the formation of a dense cross-linked polymer network. Furthermore, the overall permeation barrier formed by a barrier coating on a substrate is not always straightforwardly related to these intrinsic material properties of a cross-linked polymer network. The effectiveness of a barrier is also dependent upon an interaction between the coating material and the underlying substrate.

The present invention relates to barrier coating compositions on substrates consisting of paper or paperboard, where the substrate has at least one exposed print receptive surface. The print receptive surface is typically a surface that has been coated by the paper manufacturer with some binder resin containing clay or other platy mineral to form a smooth, white surface with some porosity. The barrier coating composition, when applied to the print receptive surface, interacts with this surface because some portion of the coating material is absorbed within pores in the paper surface. A remaining portion of the barrier coating forms a continuous layer above the surface. The effectiveness of the barrier coating on paper or paperboard thus depends both upon the formation of a continuous layer above the surface and on penetration and intimate bonding with the print receptive surface material.

A discovery was made within the scope of this invention about an unexpected effect of introducing alcohol-functional wax materials or sterols into radiation curable barrier coatings. The alcohol-functional materials formed solutions or homogeneous dispersions in radiation curable coating compositions with cycloaliphatic monomers. When printed onto paper or paperboard and exposed to actinic radiation, the coatings with alcohol functional waxes or sterols wax achieved a high level of gloss. Furthermore, when combined with other hydrophobic waxes, exposed prints retained gloss while also achieving low MVTR. The combination of the alcohol-functional materials and hydrophobic wax materials mitigates an undesired trade-off between MVTR and gloss in radiation curable coatings.

Hydrophobic, cycloaliphatic monomers may include, for example, one or more acrylate or methacrylate esters of hydrophobic, cycloaliphatic alcohols with a generic structure Formula (I) depicted as:

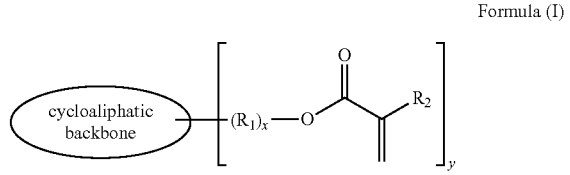

Formula (I)

wherein, $R_1$ is a linear alkyl group, a branched alkyl group, or a cycloalkyl group; $R_2$ is hydrogen or a methyl group; x is 0 or 1; and y is ≥1.

Hydrophobic, cycloaliphatic monomers used within the scope of this invention may include, for example one or more acrylate or methacrylate esters of cycloaliphatic diols, as specified below:

A) Bicyclo[2.2.1]heptanes substituted by two hydroxyalkyl groups as shown below in Formula (II), where $R_3$ and $R_4$ are each independently linear alkyl groups, a branched alkyl groups, or cycloalkyl groups.

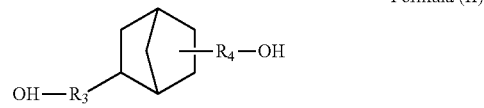

Formula (II)

Examples of Formula (II) include hydroxymethylbicyclo[2.2.1]hept-2-ylmethanol isomers (CAS 3293-90-1); and bicyclo[2.2.1]heptane-2,6-dimethanol (CAS 14180-15-5).

B) Other Bicyclo[2.2.1]heptanes substituted by two hydroxymethyl groups as shown below in Formula (III), where $R_5$ is a linear alkyl group, a branched alkyl group, or a cycloalkyl group.

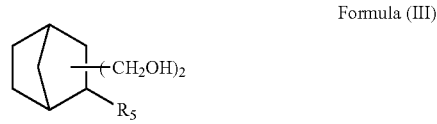

Formula (III)

Examples of Formula (III) include bicyclo[2.2.1]heptane-2,3-dimethanol (CAS 45849-05-6); bicyclo[2.2.1]heptane-2,2-dimethanol (CAS 15449-66-8); and bicyclo[2.2.1]heptane-2,2-dimethanol, 3-methyl- (CAS 91140-01-1).

C) Cyclohexanes substituted by two hydroxyalkyl groups as shown below in Formula (IX), where $R_6$ and $R_7$ are each independently linear alkyl groups, branched alkyl groups, or cycloalkyl groups and $R_8$ is a hydrogen atom or an alkyl group.

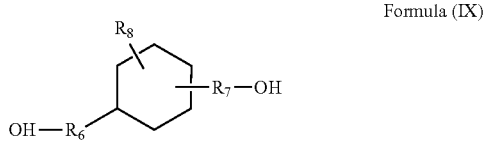

Formula (IX)

Examples of Formula (IX) include 1,1-cyclohexanedimethanol; 1,2-cyclohexanedimethanol (CAS 3971-29-7); 1,3-cyclohexanedimethanol (CAS 3971-28-6); 1,4-cyclohexane dimethanol (CAS 105-018-8); 1,1-cyclohexanedimethanol, 4-methyl-(CAS 65172-49-8); 1,1-cyclohexanedimethanol, 2-methyl- (CAS 66810-07-9); and especially mixed 1,3- and 1,4-cyclohexanedimethanol isomers such as UNOXOL diols from Dow Chemical (CAS 27193-25-5). Examples also include any of the known isomers of hydroxymethylcyclohexylpropan-1-ol, such as CAS 109942-23-6, CAS 109942-22-5, CAS 442539-66-4, and CAS 875250-14-9.

D) Tricyclodecanes, pentacyclopentadecanes, or heptacycloeicosanes substituted by two hydroxyalkyl groups as shown below in Formula (X), where $R_9$ and $R_{10}$ are each independently linear alkyl groups, branched alkyl groups, or cycloalkyl groups; n is 1 or 2; and m is 0 or 1. Examples include bis(hydroxymethyl)tricyclo[5.2.1.0$^{2,6}$]decane (CAS 26160-83-8); 3,8-tricyclo[5.2.1.0$^{2,6}$]decanedimethanol (CAS 86282-89-5); 4,8-bis(hydroxymethyl)tricyclo[5.2.1.0$^{2,6}$]decane (CAS 28132-01-6); 4,7-Methano-1H-indene-1,6-dimethanol, octahydro- (CAS 23808-06-2); and bis(hydroxymethyl)pentacyclo[6.5.1.1³,⁶0.0²,⁷0.0⁹]pentadecane.

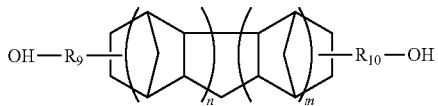

Formula (X)

E) Other saturated or unsaturated cycloaliphatic diols, such as 1,4-cyclohexanediol (CAS 556-48-9); 1,3-cyclohexanediol (CAS 504-01-8); 1,2-cyclohexanediol (CAS 931-17-9); 3-methyl-1,2-cyclohexanediol (CAS 23477-91-0); 3-cyclohexene-1,1-dimethanol (CAS 2160-94-3); 2-(3-hydroxypropoxy)-cyclohexanol; bicyclo[2.2.1]heptane-2,6-diol (CAS 14339-82-3); bicyclo[2.2.1]heptane-2,3-diol (CAS 14440-78-9); bicyclo[2.2.1]heptane-2,5-diol (CAS 5888-36-8); cyclododecanediol (CAS 29996-45-0); and 1,2-cyclopentanediol, tricyclo[3.3.1.1³,⁷]decane-1,3-diol (CAS 5001-18-3).

F) Alcohol derivatives of cyclobutane, such as 2,2,4,4-tetramethyl-1,3-cyclobutanediol (CAS 3010-96-6) and 1,2-cyclobutanediethanol (CAS 98560-43-1).

G) Bis(cyclohexanol) compounds, such as hydrogenated bisphenol A (CAS 80-04-6); 4,4'-oxybiscyclohexanol (CAS 58738-69-5); 4,4'-methylenebis cyclohexanol (CAS 20178-33-0); and 4,4'-sulfonylbiscyclohexanol CAS 58699-87-9).

Hydrophobic, cycloaliphatic monomers may also include, for example, one or more acrylate or methacrylate esters of cycloaliphatic monofunctional alcohols, such as acrylate or methacrylate esters of tetrahydrofurfuryl alcohol; isobornyl alcohol; dicyclopentadienyl alcohol; cyclohexanol; cyclopentanol; 3-methyl-bicyclo[2.2.1]heptane-2-methanol (CAS 6968-75-8); tricyclo[3.3.1.1³,⁷]decan-1-ol (CAS 768-95-6); and tricyclo[3.3.1.1³,⁷]decan-1-ol, 3,5-dimethyl- (CAS 707-37-9).

Hydrophobic cycloaliphatic monomers may also include any of these known monofunctional monomers that are commercially available, for instance, from Hitachi Chemical: FA511-AS (dicyclopentenyl acrylate); FA512-AS (dicyclopentenyloxyethyl acrylate); FA512-AS (dicyclopentanyl acrylate); FA-512M and FA-512MT (dicyclopentenyloxyethyl methacrylate); and FA-513M (dicyclopentanyl methacrylate).

Hydrophobic, cycloaliphatic monomers may also include, for example, known commercially available compounds, such as SR833S (tricyclodecanedimethanol diacrylate); CD406 (1,4-cyclohexanedimethanol diacrylate); CD401(1, 4-cyclohexanedimethanol dimethacrylate); CD421A (3,3,5-trimethylcyclohexyl methacrylate); SR217, SR611 (alkoxylated tetrahydrofurfuryl acrylate); CD535 (dicyclopentadienyl methacrylate); SR506A (isobornyl acrylate); SR423A (isobornyl methacrylate); SR285 (tetrahydrofurfuryl acrylate); SR203 (tetrahydrofurfuryl methacrylate); SR531 (cyclic trimethylolpropane formal acrylate); and all materials from Sartomer.

Hydrophobic, cycloaliphatic monomers may also include, for example, other known compounds, such as 2-propenoic acid, (3,4-dihydroxycyclohexyl)methyl ester (CAS 147321-05-9); 2-propenoic acid, (5,6-dihydroxybicyclo[2.2.1]hept-2-yl)methyl ester (CAS 265660-22-8); tricyclo[5.3.1.1³,⁹]dodecane-2,8-diol; 2,5,8-trimethyl- (CAS 211101-94-9); [1,1'-bicyclohexyl]-4,4'-diol (CAS 20601-38-1); tricyclo[3.3.1.1³,⁷]decane-1,3-diol (CAS 5001-18-3); 1,4-naphthalenedimethanol, decahydro- (CAS 10374-75-1); 1,4:5,8-dimethanonaphthalene-2-methanol, decahydro-6(or 7)-hydroxy- (9CI) (CAS 300561-00-6); 1,4:5,8-dimethanonaphthalene-2-methanol, decahydro-6(or 7)-(2-hydroxyethoxy)- (9CI) (CAS 300560-99-0); 2-propenoic acid, octahydro-2,3-dihydroxy-4,7-methano-1H-inden-5-yl ester (CAS 247262-08-4); 2-propenoic acid, octahydrohydroxy-4,7-methano-1H-inden-1(or 2)-yl ester (9CI) (CAS 217654-90-5); 2-propenoic acid, 2-methyl-, octahydro-2,3-dihydroxy-4,7-methano-1H-inden-5-yl ester (CAS 247262-16-4); 2-propenoic acid, 2-methyl-, 2-[(octahydro-1,2-dihydroxy-4,7-methano-1H-inden-5(or 6)-yl)oxy]ethyl ester (9CI) (CAS 140919-17-1); 2-propenoic acid, 2-[[octahydro-1,2(or 2,3)-dihydroxy-4,7-methano-1H-inden-5-yl]oxy] ethyl ester (9CI) (CAS 140919-18-2); 1,1-Cyclohexanedimethanol, 2,4-dimethyl- (CAS 201940-22-9); bicyclo[2.2.1]heptane-2,3-diol, 5-(hydroxymethyl) (CAS 211377-75-2); 4,9:5,8-dimethano-1H-benz[f]indene-1,3-dimethanol, dodecahydro- (9CI) (CAS 177915-14-9); bicyclo[2.2.1]heptane-1,2-diol (CAS 194608-68-9); tricyclo[5.3.1.1³,⁹]dodecane-2,8-diol, 2,5,8-trimethyl- (CAS 211101-94-9); 4,7-Methano-1H-indene-5,6-dimethanol, 3a,4,5,6,7,7a-hexahydro- (CAS 171353-69-8); 4,7-Methano-1H-indene-5,6-dimethanol, octahydro- (CAS 171353-68-7); ethanol, 2,2'-[[1,1'-bicyclohexyl]-4,4'-diylbis(oxy)]bis-(9CI) (CAS 158728-90-6); ethanol, 2,2'-[methylenebis(4,1-cyclohexanediyloxy)]bis-(9CI) (CAS 158728-89-3); tricyclo[4.3.1.1³,⁸]undecane-2,7-diol, 2,7-dimethyl-; bicyclo[3.3.1]nonane-2,6-diol, 2,6-dimethyl-; tricyclo[5.3.1.1³,⁹] dodecane-2,8-diol, 2,8-dimethyl-; bicyclo[3.3.1]nona-3,7-diene-2,6-diol, 2,6-dimethyl-; 1,4:5,8-dimethanonaphthalene-2,3-dimethanol, decahydro- (CAS 37501-78-3); tricyclo[4.3.1.1³,⁸]undecane-2,7-diol, 2,7-diethyl-; tricyclo[5.3.1.1³,⁹]dodecan-2-ol, 2-methyl-8-methylene-; bicyclo[3.3.1]nonan-2-ol, 2-methyl-6-methylene-; tricyclo[4.3.1.1³,⁸]undecane-2,7-diol, 2,7-diethyl-, 4,7-methano-1H-indene-1,3-dimethanol, octahydro- (CAS 101677-84-3); tricyclo[5.3.1.1³,⁹]dodecane-2,8-diol, 2,8-dimethyl- (CAS 105589-97-7); bicyclo[3.3.1]nonane-2,6-diol, 2,6-dimethyl- (CAS 95302-57-1); tricyclo[4.3.1.1³,⁸]undecane-2,7-diol, 2,7-dimethyl-, cholane-3,7,24-triol, 24-acetate, (3α,5β,7α)- (CAS 81418-15-7); androstane-17-methanol, 3-hydroxy-, α-acetate, (3α,5β,7α)- (CAS 81418-14-6); tricyclo[4.3.1.1³,⁸]undecane-2,7-diol, 1,4:5,8:9,10-trimethanoanthracene-2,3-dimethanol, tetradecahydro- (CAS 37501-79-4); cholane-3,7,24-triol, (3α,5β,7α)- (CAS 23848-46-6); tricyclo[3.3.1.1³,⁷]decane-2,6-diol (CAS 25106-97-2); tricyclo[3.3.1.1³,⁷]decane-2,6-diol, 2,6-diethyl- (CAS 25106-94-9); tricyclo[3.3.1.1³,⁷]decane-2,6-diol, 2,6-dimethyl- (CAS 25106-91-6); tricyclo[3.3.1.1³,⁷] decane-1,3-diol, 5,7-dimethyl- (CAS 10347-01-0); 1,4:5,8-dimethanonaphthalene-2-methanol, 1,2,3,4,4a,5,8,8a-octahydro- (CAS 7329-04-6); and bicyclo[2.2.1]hept-5-ene-2,2-dimethanol (CAS 6707-12-6).

In a preferred embodiment, the hydrophobic cycloaliphatic monomer is tricyclodecane dimethanol diacrylate or dicyclopentenyl monoacrylate.

Non-limiting examples of alcohol-functional waxes include linear solid alkanols (such as 1-hexadecanol, 1-octadecanol, or Unilin alcohols from Baker Hughes) and alcohol-functional branched polyolefins (such as Vybar H-6175). Other examples of alcohol-functional wax materials include capryl alcohol (1-octanol), 2-ethyl hexanol, pelargonic alcohol (1-nonanol), capric alcohol (decyl alcohol), undecyl alcohol (undecanol), lauryl alcohol (dodecanol), tridecyl alcohol (tridecanol), myristyl alcohol (1-tetradecanol), pentadecyl alcohol, palmitoleyl alcohol (cis-9- hexadecen-1-ol), heptadecyl alcohol, isostearyl alcohol, elaidyl alcohol, oleyl alcohol (cis-9-octadecen-1-ol), linoleyl alcohol (9Z,12Z-octadecadien-1-ol), elaidolinoleyl alcohol (9E,12E-octadecadien-1-ol), linolenyl alcohol (9Z,12Z, 15Z-octadecatrien-1-ol), elaidolinolenyl alcohol (9E,12E, 15-E-octadecatrien-1-ol), ricinoleyl alcohol (12-hydroxy-9-octadecen-1-ol), nonadecyl alcohol, arachidyl alcohol (1-eicosanol), heneicosyl alcohol, behenyl alcohol, erucyl alcohol, lignoceryl alcohol, ceryl alcohol (1-hexacosanol), 1-heptacosanol, montanyl alcohol, cluytyl alcohol (1-octacosanol), 1-nonacosanol, myricyl alcohol, melissyl alcohol (1-triacontanol), 1-dotriacontanol, geddyl alcohol, and cet-earyl alcohol.

The most preferable examples of alcohol functional waxes of this invention are Vybar H-6175 or certain linear alcohols, such as 1-tridecanol, 1-hexadecanol, or 1-octadecanol. Alcohol-functional waxes most useful for this invention have hydroxyl values in the range of about 100-300 mg KOH/g.

In a preferred embodiment, the alcohol-functional wax or sterol is a linear solid alkanol or alcohol-functional branched polyolefin.

Non-limiting examples of sterols include cholesterol, ergosterol, lanosterol, estradiol, testosterone, and cycloartenol.

The hydrophobic wax of the coating composition can be selected from the group consisting of microcrystalline waxes, paraffin waxes, synthetic waxes, semi-crystalline waxes, petroleum waxes, chemically modified waxes, animal waxes, vegetable waxes, mineral waxes, straight chain saturated n-alkane hydrocarbons, isoparaffinic hydrocarbons, naphthenic hydrocarbons, n-alkane saturated hydrocarbons, paraffin and microcrystalline wax mixtures, Fisher-Tropsch waxes, polyethylene waxes, polypropylene waxes, polymethylene waxes, chemically modified waxes, polymerized alpha-olefins, waxes, polyethylene-block-polyethylene glycol waxes, polyethylene-block-polyethylene glycol and polyethylene mono-alcohol wax mixtures, amide waxes (such as stearamide, oleamide, or erucamide), paraffin waxes chemically modified by adduct formation, cracking reaction, and free radical reaction, and mixtures thereof.

The most preferable examples of hydrophobic waxes for the composition of this invention are paraffin waxes with a melting point in the range of approximately 40° C. to 50° C.

Other radiation curable monomers that may be optionally incorporated into the composition of this invention may include, for example, one or more of: dipropylene glycol diacrylate; tripropylene glycol diacrylate; butanediol diacrylate; hexanediol diacrylate; alkoxylated hexanediol diacrylate; trimethyol propane triacrylate; alkoxylated trimethylol propane triacrylate; di(trimethylol propane triacrylate); glycerolpropoxy triacrylate; pentaerythritrol triacrylate; alkoxylated pentaerythritrol triacrylate; di(pentaerythritrol triacrylate); neopentaglycol diacrylate; alkoxylated neopentaglycol diacrylate; dipropylene glycol dimethacrylate; tripropylene glycol dimethacrylate; butanediol dimethacrylate; hexanediol dimethacrylate; alkoxylated hexanediol dimethacrylate; trimethyol propane trimethacrylate; alkoxylated trimethylol propane trimethacrylate; di(trimethylol propane methtriacrylate); glycerolpropoxy trimethacrylate; pentaerythritrol trimethacrylate; alkoxylated pentaerythritrol trimethacrylate; di(pentaerythritrol trimethacrylate); neopentaglycol dimethacrylate; alkoxylated neopentaglycoldimethacrylate; acrylated epoxy resins; his acrylic esters of bisphenol A (such as di-(3-methacryloxy-2-hydroxypropyl ether of bisphenol-A; di(2-methacryloxyethyl ether of bisphenol-A; di-(3-acryloxy-2-hydroxypropyl ether of bisphenol-A; di(2-acryloxyethyl ether of bisphenol-A, etc.); acrylated polyurethanes; acrylated polyesters; and acrylated polyethers, etc, disclosed in, for example, U.S. Pat. No. 7,479,511 (Laksin et al.), issued Jan. 20, 2009; U.S. Pat. No. 7,612,122 (Herlihy), issued Nov. 3, 2009, the entire contents and disclosure of which are herein incorporated by reference.

Other radiation curable monomers that may be optionally incorporated into the composition of this invention may include, for example, one or more of: urethane acrylates, aliphatic urethane acrylates, aliphatic urethane triacrylate/monomer blends, aliphatic urethane triacrylates blended with 1,6-hexanediol acrylates, hexafunctional urethane acrylates, siliconized urethane acrylates, aliphatic siliconized urethane acrylates, polyether acrylates, trimethylolpropane triacrylates, 2-phenoxyethyl acrylates, isobornyl acrylates, propoxylated glyceryl triacrylates, acrylate ester derivatives, methacrylate ester derivatives, acrylate ester derivatives and tripropylene glycol diacrylate, etc.

Preferably, the coating composition of the present invention comprises up to 40 wt. % of one or more of radiation curable monomers, oligomers, or resins other than the hydrophobic cycloaliphatic monomers.

The coating composition of the present invention may optionally be blended with one or more other reactive or non-reactive resin components. These optional resins may be used to modify specific properties of the compositions, such as toughness, flexibility, adhesion to certain substrates, or to minimize weight loss during or after cure. The amount of these other resin components will varying depending on the application, processing conditions, and barrier requirements, but will generally fall within the range of 1-40% of the total resinous portion of the barrier coating composition.

A radiation curable barrier coating within the scope of this invention, if cured by ultraviolet light, may contain one or more photoinitiators. The selection of photoinitiators for the inventive radiation curable barrier coating is familiar to those skilled in the art of radiation curing. Generally, for systems that cure via a radical mechanism, either Type I (cleavage) or Type II (H abstraction) radical photoinitiators may be used. Small molecule, polymeric, or polymerizable photoinitiators may be used. For many applications, common cleavage photoinitiators, such as those offered by Ciba Specialty Chemicals, are useful. Alternatively, a preferred class of photoinitiators are polymer-bound aromatic ketones, or polymeric Type II photoinitiators. Such systems do not produce small molecule photo by-products, and therefore tend to produce less odor, outgassing, and extractable components upon UV cure. Such systems may or may not require a photosensitizer, depending on the specific application and resin system used.

The coatings of the present invention may optionally be blended with other organic or inorganic fillers, which are known to those skilled in the art of composite materials. Common fillers include, but are not limited to ground quartz, fused silica, amorphous silica, talc, glass beads, graphite, carbon black, alumina, clays, mica, vermiculite, aluminum nitride, and boron nitride. Metal powders and flakes consisting of silver, copper, gold, tin, tin/lead alloys, and other alloys are contemplated. Organic filler powders such as poly(tetrachloroethylene), poly(chlorotriflouroethylene), and poly(vinylidene chloride) may also be used. Fillers that act as desiccants or oxygen scavengers, including but not limited to, CaO, BaO, $Na_2SO_4$, $CaSO_4$, $MgSO_4$, zeolites, silica gel, $CaCl_2$, and $Al_2O_3$ may also be utilized.

The coating composition of this invention may optionally further include slip aids, flow aids, leveling agents, inhibitors, silicas, optical brighteners, cure accelerators, defoaming agents, deaerators, UV light stabilizers, UV absorbers, pigments, dyes, adhesion promoters, or resins.

The coating composition of this invention may be manufactured by blending together the coating ingredients, including the alcohol-functional waxes or sterols and the hydrophobic waxes, using a conventional mixer suitable for the preparation of flexographic inks and coatings, which equipment would be known to those skilled in the art. After initially blending the coating ingredients together, the composition may be heated to a temperature preferably no greater than 80° C. with continued mixing to facilitate more complete blending and mixing of the wax components into the coating formula to form a homogeneous liquid. The hydrophobic wax materials and alcohol-functional materials will preferably each have a low melting point less than 80° C. Most preferably, the hydrophobic wax materials will be paraffin waxes with melting points less than 50° C.

The coating compositions of the present invention may be printed onto paper or paperboard using a flexographic printing process. This printing process imposes constraints on physical properties of the barrier coating composition, because the composition must have rheological properties and chemical properties that are within the required parameters for flexographic printing. These requirements are generally known to those skilled in the art. The viscosity of the barrier coating composition at 25° C. should be preferably within a range between 50 and 2000 cP at 100 $s^{-1}$. The composition must adhere to the surfaces of the anilox roller and adhere to the surface of a flexographic plate that transfers a printed image to the substrate. The ingredients of the composition would preferably be compatible with the plate material so not to cause swelling, distortion, or degradation of the plate material.

Within the known parameters of the flexographic printing process, several different printing processes can be envisioned to print the barrier coating onto a paper packaging substrate. Paper packaging substrate material may be introduced in the form of discrete sheets or boards or in the form of a continuous roll. In one embodiment of this invention, the barrier coating may be printed in one pass through a printing press onto the print receptive surface of the paper substrate and cured by actinic radiation immediately after printing. The MVTR and the gloss of the barrier coating achieved in this process is dependent on mechanical properties of the flexographic printing unit. In particular, the achievement of high gloss and low MVTR presupposes that the flexographic printing system used has an anilox roller with a cell volume that is sufficient to deliver to the substrate a coating weight of approximately 7 gsm. A lower coating weight delivered by the flexographic printing system is also possible but may fail to form a smooth continuous coating surface on the paper package.

Printing onto other substrates could also be envisioned within the scope of this invention. Other possible substrates include plastic films that are commonly used as packaging materials, including polyethylene, polypropylene, polybutylene, polyisobutylene, polystyrene, polyvinyl chloride, polyvinylidene chloride, polycarbonate, polyamide, polymethylmethacrylate, polyurethane, polyesters (such as polyethylene terephthalate), polylactic acid, and polyhydroxyalkanoates (such as poly-3-hydroxybutyrate).

Preferably, the basis weight of the paper or paperboard substrate is in the range of 200-600 grams per square meter (gsm) and the substrate has a smooth print receptive surface.

Also preferably, the printed substrate coating weight is in the range of about 1 to 40 grams per square meter (gsm), more preferably about 4 to 12 gsm.

Again preferably, the printed paper or paperboard substrate of the present invention has a printed area with a 100% level of coating coverage with an MVTR that is reduced to less than 25%, more preferably less than 10% of the MVTR of the uncoated substrate.

In another embodiment of the present invention, printing inks may first be printed onto the substrate to form a printed image. The inks used may be lithographic offset inks, flexographic inks, ink jet inks, or any other types of printing inks that are known in the art. The barrier coating may then be printed flexographically over the printed inks and cured by actinic radiation immediately after printing. The application of inks and barrier coating may occur all in one pass through the printing press or may occur in multiple stages.

In another embodiment of the present invention, the barrier coating composition may be printed two or more times onto the print receptive surface of the paper substrate, occurring in two or more passes through the printing press, and the barrier coating layers may cured by actinic radiation immediately after printing during each pass. The coating composition is used to form a multi-layer barrier on the substrate in this embodiment. The process of applying the barrier coating to the substrate in more than one layer may be needed, if the flexographic printing unit is not capable of delivering a sufficient coating weight to the substrate in one pass, or if more robust barrier properties, associated with multiple layers, are desired.

In a preferred embodiment of the present invention, the barrier coating is printed two or more times onto the print receptive surface of the paper substrate during one pass through a printing press that has two or more flexographic printing units. The barrier coating is printed onto the substrate in the first flexographic printing unit as a primer coating that wets the substrate surface. The barrier coating printed onto the substrate in the second or following printing unit provides a topcoat layer. The first-down primer coating may or may not be exposed to actinic radiation inter-station prior to application of the second topcoat layer. Most preferably, the first-down primer coating will not be exposed to actinic radiation inter-station, and the two-layer printed barrier coating will be exposed to actinic radiation only after passing through the second flexographic printing unit.

In another embodiment of the present invention, the barrier coating composition may be printed onto the print receptive surface of the substrate during one pass through the printing press, and the barrier coating may also printed onto the opposite side of the substrate during a separate pass through the printing press. The substrate material used in this process would need to be rerolled to expose the opposite side, if in the form of a roll. The substrate material would need to be turned upside down, if in the form of discrete sheets. The MVTR of the printed material formed by this process depends on the combined effects of two barrier coatings on opposite sides of the substrate.

Table 1 shows the range of different performance values for gloss and MVTR that occur as a result of differences in the flexographic printing process. The barrier coating composition consisted of 1% Vybar H-6175, 1% low melting paraffin wax, 1% BYK361N leveling agent, 4.9% of Irgacure 754 photoinitiator, 4.9% of Omnirad TPO-L photoinitiator, and the balance of 87.2% Sartomer SR833S cycloaliphatic monomer. Prints were made using a Flexiproof 100 with a 10.2 bcm anilox roller. The substrate was a white lined chipboard with approximately 400 gsm basis weight (Substrate B, described below).

TABLE 1

Gloss and MVTR Results in Different Flexographic Printing Processes

| Printing Process | MVTR (g/m² day) | Gloss 60° |
|---|---|---|
| Printed one pass | 45 | 66 |
| Printed two passes, exposed each pass | 27 | 80 |
| Printed two passes, exposed only second pass | 15 | 73 |
| Printed one pass print receptive side, one pass opposite side | 32 | 65 |

MVTR was measured at a temperature of 23° C. and at a relative humidity of 85% using Gardner Permeability Cups (PO-2301). Temperature and humidity were maintained in a Nor-lake Scientific test chamber, Model NSRI241WSW. Tests were performed consistent with ISO 2528. The exposed sample area for the test was 25 cm². All samples were tested with the barrier coating side facing outside of the cup and with the uncoated side facing the interior. A clear polymer gasket was located in the lid of the cup between the sample and the screw-top lid. A black rubber gasket was located underneath a metal retaining ring. The interior of each cup contained a desiccant. MVTR was calculated from the slope of a linear plot of cup weight versus time through 5 points. The duration of each test was approximately 70 hours. The plots showed excellent linearity throughout. Proofs were prepared using a Flexiproof 100 UV laboratory proofing unit. The speed of the proofing unit was 17 meters/min. The proofs were exposed to ultraviolet light using a lamp attached to the proofing unit. The lamp had a 200 W/cm peak power and a wavelength range of 310-370 nm. The exposures were in the range of 200-400 mJ/cm² per proof. The reported gloss of the Flexiproof generated proofs is the gloss measured in the machine direction, parallel to the direction of travel of the sheet of paperboard on the impression cylinder.

In another preferred embodiment of the present invention, the barrier coating composition circulates in a reservoir of the flexographic printing unit, and the composition is heated within the printing unit at a temperature higher than room temperature, preferably higher than the melting point of hydrophobic wax material contained in the barrier coating. If the hydrophobic wax used is low melting paraffin wax with a melting point in the range of between 40° C. and 50° C., then this moderately warm temperature could be maintained in the unit using heated rollers, heat water jackets, or other heating methods that are not difficult to devise.

Though the radiation curable coatings of the present invention are preferably printed using a flexographic printing process, they may also be modified for viscosity and rheology for use in other coating methods, such as for example, gravure, reverse roll, cascade, curtain, slot, wire-wound bar, spray etc.

The present invention has been described in detail, including the preferred embodiments thereof. However, it will be appreciated that those skilled in the art, upon consideration of the present disclosure, may make modifications and/or improvements on this invention that fall within the scope and spirit of the invention.

The following examples illustrate specific aspects of the present invention and are not intended to limit the scope thereof in any respect and should not be so construed

EXAMPLES

The following examples illustrate specific aspects of the present invention and are not intended to limit the scope thereof in any respect and should not be so construed.

Tables below show the weight percentages of all raw materials incorporated into barrier coatings exemplifying this invention. The coatings were used to make laboratory proofs on sheets of paper or paperboard. All ingredients were added together in 50-100 g laboratory scale batches. The ingredients were blended together by stirring. The compositions containing alcohol-functional wax materials and hydrophobic wax materials were further processed by heating the blended ingredients in a convection oven at 80° C. for approximately one hour. Compositions were then removed from the oven, and the ingredients including melted or partially melted solid materials were further blended together by stirring to make a clear homogeneous liquid.

The examples summarized in Tables 2-5 were prepared by drawing down liquid coating material over the ink receptive surface of the board using a wire-bound rod (a #1 K-bar from Testing Machines, Inc). Ultraviolet light exposures of the proofs were made on an RPC Industries UV Processor with an H bulb. The UV exposure was measured using a Power Puck dose meter, adding together the sum of UV-A, UV-B, UV-C, and visible exposures. The exposures were in the range of 200-400 mJ/cm². UV exposures were performed without a nitrogen blanket. Electron beam exposures of proofs were made on an AEB E-beam curing unit. E-beam exposures were performed using a nitrogen blanket maintaining an oxygen level below 400 ppm. The radiant energy imparted was 30 kGy. The substrate rate of travel through the curing unit was 50 ft. per min. The accelerating voltage was 100 kV.

The following paper or paperboard substrates were used to prepare proofs for examples in Tables 2-5: Substrate A was a white lined chipboard with a basis weight of approximately 400 gsm; Substrate B was a white lined chipboard with a basis weight of approximately 400 gsm; The uncoated substrates had the following MVTR values prior to the application of printable radiation cured barrier coatings: Substrate A: approximately 600 g/m² day; and Substrate B: approximately 800 g/m² day.

Gloss and MVTR values were obtained from proofs made by applying each coating composition to a sheet of paper or paperboard. Coatings were applied to the ink receptive side of paper or paperboard. The ink receptive side of paperboard substrates was a uniform white, clay coated surface. Gloss was measured at an incidence angle of 60° using a BYK Gardner micro-TRI-gloss unit. Reported gloss values are an average of measurements recorded parallel and perpendicular to the direction in which the draw-down was performed using the K-bar. MVTR was measured at a temperature of 23° C. and at a relative humidity of 85% using Gardner Permeability Cups (PO-2301). Temperature and humidity were maintained in a Nor-lake Scientific test chamber, Model NSRI241WSW. Tests were performed consistent with ISO 2528. The exposed sample area for the test was 25 cm². All samples were tested with the barrier coating side facing outside of the cup and with the uncoated side facing the interior. A clear polymer gasket was located in the lid of the cup between the sample and the screw-top lid. A black rubber gasket was located underneath a metal retaining ring. The interior of each cup contained a desiccant. MVTR was calculated from the slope of a linear plot of cup weight versus time through 5 points. The duration of each test was approximately 70 hours. The plots showed excellent linearity throughout.

Example 1

Inventive

A clear barrier coating was made using tricyclodecane dimethanol diacrylate (SR833S from Sartomer Corporation). Vybar H-6175 (from Baker Hughes), and paraffin wax (from Aldrich, Cat. #327204) were both incorporated together at a combined level of 2.0 wt. %. Two photoinitiators, Irgacure 754 and Omnirad TPO, were added. A leveling agent BYK-361N and a cure inhibitor Genorad 16 were also added. This composition was coated onto substrate A at a temperature of approximately 55° C. and immediately cured. The cured proof made from this coating composition exemplifies a low MVTR value combined with a higher level of gloss versus Comparative Example 2, containing no alcohol-functional material. The cured proof of the composition within the scope of this invention also has a lower MVTR than the proof of Comparative Example 3, containing a cycloaliphatic monomer but no wax or alcohol-functional material. The proof also has a much lower MVTR than the proof of Comparative Example 4, containing no cycloaliphatic monomer (see Table 2).

Example 2

Comparative

A clear barrier coating was constructed, and a cured proof on paperboard was obtained in the same way described for Example 1 above. The coating composition contains the paraffin wax only, omitting alcohol-functional wax, incorporated at a level of 2 wt. %. This composition was coated onto substrate A at a temperature of approximately 55° C. and immediately cured. The proof generated in this example has a lower gloss and a higher MVTR value than the proof of Example 1 made within the scope of the present invention (see Table 2).

Example 3

Comparative

A clear barrier coating was constructed, and proof on paperboard was obtained in the same way described for Example 1 above. The coating composition contains a cycloaliphatic monomer, but it contains no added paraffin wax nor alcohol-functional material. This composition was coated onto substrate A at room temperature and immediately cured. The MVTR of the proof is significantly higher than the MVTR of the proof of Example 1 made using a coating composition within the scope of the present invention (see Table 2).

Example 4

Comparative

A composition that exemplifies a typical radiation cured clear overprint varnish was tested in the same way described for Example 1 above. This coating contained a conventional reactive acrylate monomer and a conventional reactive oligomer suitable for use in a clear UV curable overprint varnish for application to paper packaging. The composition contained no cycloaliphatic acrylate monomers, no hydrophobic wax, no alcohol-functional wax, and no sterol. The composition contains photoinitiators, inhibitor, and leveling agent. This composition was coated onto substrate A at room temperature and immediately cured. The MVTR of the proof made from this conventional overprint varnish is much higher than the MVTR of the proof made using a coating composition within the scope of the present invention (see Table 2).

TABLE 2*

MVTR and Gloss for Cured Barrier Coating Proofs of Examples 1-4.

|  | Ex. 1 (Inventive) 169E | Ex. 2 (Comp.) 169D | Ex. 3 (Comp.) 150E | Ex. 4 (Comp.) 137E |
|---|---|---|---|---|
| Raw Material: | | | | |
| SR833S (cycloaliphatic) | 87.1 | 87.1 | 89.3 | — |
| Vybar H-6175 (alcohol-functional) | 1.0 | — | — | — |
| paraffin wax (Aldrich Cat. #327204) | 1.0 | 2.0 | — | — |
| EO-TMPTA | — | — | — | 60.0 |
| Ebecryl 9161 | — | — | — | 29.3 |
| Irgacure 754 | 5.0 | 5.0 | 5.0 | 5.0 |
| Omnirad TPO-L | 5.0 | 5.0 | 5.0 | 5.0 |
| Genorad 16 | 0.4 | 0.4 | 0.2 | 0.2 |
| BYK361-N | 0.5 | 0.5 | 0.5 | 0.5 |
| Total (wt. %) | 100.0 | 100.0 | 100.0 | 100.0 |
| Substrate A: | | | | |
| Gloss | 54 | 23 | 93 | 90 |
| MVTR (g/m2 day) | 8 | 11 | 14 | 42 |

*Draw-downs with #1 K-bar. UV exposure

Table 3 shows an example of an electron-beam curable coating within the scope of this invention.

Example 5

Inventive

A clear barrier coating was made using tricyclodecane dimethanol diacrylate (SR833S from Sartomer Corporation). 1-Hexadecanol (from Sigma-Aldrich) and paraffin wax (Ross 118/125) were both incorporated together at a combined level of 2.0 wt. %. A leveling agent BYK-361N was also added. This composition was coated onto substrate A at room temperature and immediately cured. The cured proof made from this coating composition exemplifies a low MVTR value combined with a higher level of gloss versus Comparative Example 6. The cured proof made from this coating composition also has a lower MVTR than Comparative Example 7, containing only cycloaliphatic monomer and alcohol-functional material. The cured proof made from this coating composition also has a much lower MVTR than Comparative Example 8, containing no cycloaliphatic monomer (see Table 3).

Example 6

Comparative

A clear barrier coating was constructed, and a proof on paperboard was obtained in the same way described for Example 5 above. The coating composition contains hydrophobic paraffin wax only, omitting alcohol-functional material, at a level of 2.0 wt. %. This composition was coated onto substrate A at room temperature and immediately cured. The proof generated in this example has a lower gloss than the proof of Example 5 made using a coating composition within the scope of this invention. (see Table 3).

Example 7

Comparative

A clear barrier coating was constructed, and proof on paperboard was obtained in the same way described for Example 5 above. The coating composition contains cycloaliphatic monomer and alcohol-functional material only, omitting hydrophobic paraffin wax, at a level of 2.0 wt. %. This composition was coated onto substrate A at room temperature and immediately cured. The MVTR value of the proof is higher than the MVTR of the proof of Example 5 made using a coating composition within the scope of the present invention (see Table 3).

Example 8

Comparative

A composition that exemplifies a typical radiation cured clear overprint varnish was tested in the same way described for Example 5 above. This coating contained a conventional reactive acrylate monomer and a conventional reactive oligomer suitable for use in a clear electron-beam curable overprint varnish for application to paper. The composition contained no cycloaliphatic acrylate monomers, no hydrophobic wax, no alcohol-functional wax, nor any sterol. The MVTR values of the proof made from this conventional overprint varnish is significantly higher than the MVTR value of the proof of Example 5 made using a coating composition within the scope of the present invention (see Table 3).

TABLE 3*

MVTR and Gloss for Electron Beam Cured Barrier Coating Proofs of Examples 5-8.

| Raw Material | Ex. 5 (Inventive) 131C | Ex. 6 (Comp.) 131D-2 | Ex. 7 (Comp.) 131B-2 | Ex. 8 (Comp.) 137F |
|---|---|---|---|---|
| SR833S (cycloaliphatic) | 97.5 | 97.5 | 97.5 | — |
| EO-TMPTA | — | — | — | 49.5 |
| Ebecryl 9160 | — | — | — | 30 |
| Photomer 3524 | — | — | — | 20 |
| 1-hexadecanol (alcohol-functional) | 1.0 | — | 2.0 | — |
| paraffin wax (Ross 118/125) | 1.0 | 2.0 | — | — |
| BYK361N | 0.5 | 0.5 | 0.5 | 0.5 |
| Total (wt. %) | 100.0 | 100.0 | 100.0 | 100.0 |
| Substrate A: | | | | |
| Gloss | 81 | 61 | 93 | 89 |
| MVTR (g/m² day) | 8 | 9 | 14 | 47 |

*Draw-downs with #1 K-bar. E-beam exposure conditions: 30 kGy, 50 fpm, voltage 100 kV.

Table 4 below shows other examples of coatings within the scope of this invention that contain alcohol-functional waxes or sterols.

Example 9

Inventive

A clear barrier coating was made using tricyclodecane dimethanol diacrylate (SR833S from Sartomer Corporation). 1-Tridecyl alcohol and paraffin wax (Ross 118/125) were both incorporated together at a combined level of 4.0 wt. %. Two photoinitiators, Irgacure 754 and Omnirad TPO, were added. A leveling agent BYK-361N and a cure inhibitor Genorad 16 were also added. This composition was coated onto substrates A and B at room temperature and immediately cured. The proofs made from this coating composition exemplify high gloss and low MVTR versus Comparative Example 13 (see Table 4).

Example 10

Inventive

A clear barrier coating was constructed, and proof on paperboard was obtained in the same way described for Example 9 above. 1-Hexadecyl alcohol and paraffin wax (Ross 118/125) were both incorporated together at a combined level of 4.0 wt. %. This composition was coated onto substrates A and B at room temperature and immediately cured. The proofs made from this coating composition exemplify high gloss and low MVTR versus Comparative Example 13 (see Table 4).

Example 11

Inventive

A clear barrier coating was constructed, and proof on paperboard was obtained in the same way described for Example 9 above. 1-Octadecyl alcohol and paraffin wax (Ross 118/125) were both incorporated together at a combined level of 4.0 wt. %. This composition was coated onto substrates A and B at room temperature and immediately cured. The proofs made from this coating composition exemplify high gloss and low MVTR versus Comparative Example 13 (see Table 4).

Example 12

Inventive

A clear barrier coating was constructed, and proof on paperboard was obtained in the same way described for Example 9 above. Cholesterol and paraffin wax (Ross 118/125) were both incorporated together at a combined level of 4.0 wt. %. This composition was coated onto substrates A and B at room temperature and immediately cured. The proofs made from this coating composition exemplify high gloss and low MVTR versus Comparative Example 13 (see Table 4).

Example 13

Comparative

A clear barrier coating was constructed, and proof on paperboard was obtained in the same way described for Example 9 above. The barrier coating was made using tricyclodecane dimethanol diacrylate (SR833S) and paraffin wax (Ross 118/125) at a level of 4.0 wt. %, omitting any alcohol-functional material. This composition was coated onto substrates A and B at a temperature of approximately 55° C. and immediately cured. The proof made from this coating composition has a higher MVTR and lower gloss than proofs of Inventive Examples 9-12 (see Table 4).

TABLE 4*

MVTR and Gloss for Barrier Coating Proofs using Other Alcohol-Functional Waxes or Sterols of Examples 9-13.

|  | Ex. 9 (Inventive) 158A-2 | Ex. 10 (Inventive) 158B-2 | Ex. 11 (Inventive) 158C-2 | Ex. 12 (Inventive) 158D-2 | Ex. 13 (Comp.) 179A |
|---|---|---|---|---|---|
| Raw Material |  |  |  |  |  |
| SR833S (cycloaliphatic) | 85.3 | 85.3 | 85.3 | 85.3 | 85.3 |
| 1-tridecyl alcohol (alcohol-functional) | 2.0 | — | — | — | — |
| 1-hexadecanol (alcohol-functional) | — | 2.0 | — | — | — |
| 1-octadecyl alcohol (alcohol-functional) | — | — | 2.0 | — | — |
| cholesterol (sterol) | — | — | — | 2.0 | — |
| paraffin (Ross 118/125) | 2.0 | 2.0 | 2.0 | 2.0 | 4.0 |
| Irgacure 754 | 5.0 | 5.0 | 5.0 | 4.9 | 5.0 |
| Omnirad TPO-L | 5.0 | 5.0 | 5.0 | 4.9 | 5.0 |
| Genorad 16 | 0.2 | 0.2 | 0.2 | 0.2 | .2 |
| BYK361N | 0.5 | 0.5 | 0.5 | 0.5 | .5 |
| Total (wt. %) | 100.0 | 100.0 | 100.0 | 100.0 | 100.0 |
| Substrate A: |  |  |  |  |  |
| Gloss | 59 | 62 | 58 | 65 | 14 |
| MVTR (g/m² day) | 8 | 7 | 8 | 6 | 12 |
| Substrate B: |  |  |  |  |  |
| Gloss | 65 | 64 | 66 | 65 | 20 |
| MVTR (g/m² day) | 8 | 8 | 8 | 7 | 12 |

*Draw-downs with #1 K-bar

Table 5 shows examples of coatings within the scope of this invention that contain other cycloaliphatic monomers.

Example 14

Inventive

A clear barrier coating was constructed using two cycloaliphatic monomers, tricyclodecane dimethanol diacrylate (SR833S) and cyclohexane dimethanol diacrylate (CHDMDA). The CHDMDA monomer used was a homogeneous clear solution of cyclohexane dimethanol diacrylate isomers prepared from Sartomer CD406 by pressing the solid material through a filter to separate from it the liquid portion. Vybar H-6175 (from Baker Hughes), and paraffin wax (Ross 118/125) were both incorporated together at a combined level of 4.0 wt. %. Two photoinitiators, Irgacure 754 and Omnirad TPO, were added. A leveling agent BYK-361N and a cure inhibitor Genorad 16 were also added. This composition was coated onto substrates A and B at room temperature and immediately cured. The proofs made from this coating composition exemplify high gloss and low MVTR versus Comparative Example 15 (see Table 5).

Example 15

Comparative

A clear barrier coating was constructed, and proof on paperboard was obtained in the same way described for Example 14 above. The coating composition contains hydrophobic paraffin wax only at a level of 4.0 wt. %, omitting alcohol-functional wax. This composition was coated onto substrates A and B at room temperature and immediately cured. The proofs made from this coating composition have higher MVTR values and lower gloss than proofs of Inventive Example 14 (see Table 5).

Example 16

Inventive

A clear barrier coating was constructed using two cycloaliphatic monomers, tricyclodecane dimethanol diacrylate (SR833S) and dicyclopentenyl monoacrylate (FA511-AS from Hitachi Chemical). Vybar H-6175 (from Baker Hughes) and paraffin wax (Ross 118/125) were both incorporated together at a combined level of 2.0 wt. %. Two photoinitiators, Irgacure 754 and Omnirad TPO, were added. A leveling agent BYK-361N and a cure inhibitor Genorad 16 were also added. This composition was coated onto substrate A at room temperature and immediately cured. The proof made from this coating composition exemplifies high gloss and low MVTR versus Comparative Example 17 (see Table 5).

Example 17

Comparative

A clear barrier coating was constructed, and proof on paperboard was obtained in the same way described for Example 16 above. The coating composition contains hydrophobic paraffin wax only at a level of 2.0 wt. %, omitting alcohol-functional material. This composition was coated onto substrate A at room temperature and immediately cured. The proof made from this coating composition has a higher MVTR value and lower gloss than the proof of Inventive Example 16 (see Table 5).

TABLE 5*

MVTR and Gloss Barrier Coating Proofs using Other Cycloaliphatic Monomers of Examples 14-17.

|  | Ex. 14 (Inventive) 131H-3 | Ex. 15 (Comp.) 131G-3 | Ex. 16 (Inventive) 132D | Ex. 17 (Comp.) 132B-2 |
|---|---|---|---|---|
| Raw Material |  |  |  |  |
| SR833S (cycloaliphatic) | 42.8 | 42.8 | 43.65 | 43.65 |
| CHDMDA (cycloaliphatic) | 42.8 | 42.8 | — | — |
| FA-511AS (cycloaliphatic) | — | — | 43.65 | 43.65 |
| Vybar H-6175 (alcohol-functional) | 2.0 | — | 1.0 | — |
| paraffin (Ross 118/125) | 2.0 | 4.00 | 1.0 | 2.0 |
| Irgacure 754 | 4.85 | 4.85 | 5.0 | 4.9 |
| Omnirad TPO-L | 4.85 | 4.85 | 5.0 | 4.9 |
| Genorad 16 | 0.2 | 0.2 | 0.2 | 0.2 |
| BYK361N | 0.5 | 0.5 | 0.5 | 0.5 |
| Total (wt. %) | 100.0 | 100.0 | 100.0 | 100.0 |
| Substrate A: |  |  |  |  |
| Gloss | 61 | 53 | 82 | 53 |
| MVTR (g/m² day) | 9 | 13 | 6 | 10 |
| Substrate B: |  |  |  |  |
| Gloss | 70 | 49 | — | — |
| MVTR (g/m² day) | 10 | 13 | — | — |

*Draw-downs with #1 K-bar onto Substrate 1.

All references cited herein are herein incorporated by reference in their entirety for all purposes.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the invention.

I claim:

1. A coating composition comprising:
   (a) 40% or more of one or more hydrophobic cycloaliphatic monomer;
   (b) from 0.1% to 10% of one or more alcohol-functional wax or sterol; and
   (c) from 0.1% to 10% of one or more hydrophobic wax material,
wherein, said coating composition is a printable radiation curable barrier coating composition.

2. The coating composition of claim 1, wherein said one or more hydrophobic cycloaliphatic monomer has a chemical structure according to Formula (I):

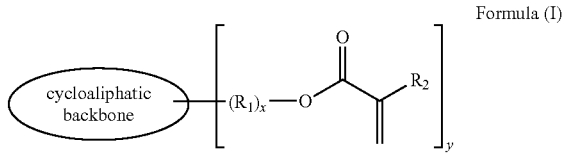

Formula (I)

wherein, $R_1$ is selected from the group consisting of a linear alkyl group, a branched alkyl group and a cycloalkyl group; $R_2$ is hydrogen or a methyl group; x is 0 or 1; and y is $\geq 1$.

3. The coating composition of claim 1, wherein said hydrophobic cycloaliphatic monomer has a chemical structure selected from the group consisting of Formula (II), Formula (III), Formula (IX) and Formula (X):

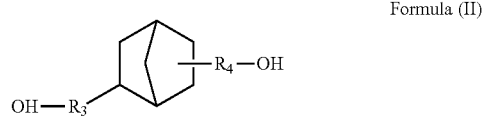

Formula (II)

wherein, $R_3$ and $R_4$ are each independently selected from the group consisting of linear alkyl groups, a branched alkyl groups and cycloalkyl groups,

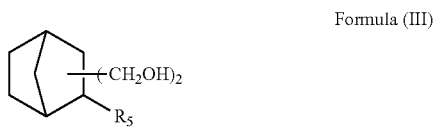

Formula (III)

wherein, $R_5$ is selected from the group consisting of a linear alkyl group, a branched alkyl group and a cycloalkyl group,

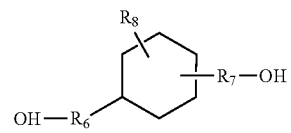

Formula (IX)

wherein, $R_6$ and $R_7$ are each independently selected from the group consisting of linear alkyl groups, branched alkyl groups and cycloalkyl groups; and
$R_8$ is a hydrogen atom or an alkyl group,

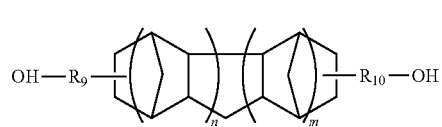

Formula (X)

wherein, $R_9$ and $R_{10}$ are each independently selected from the group consisting of linear alkyl groups, branched alkyl groups, or cycloalkyl groups; n is 1 or 2; and m is 0 or 1.

4. The coating composition of claim 1, wherein said one or more hydrophobic cycloaliphatic monomer is tricyclodecane dimethanol diacrylate or dicyclopentenyl monoacrylate.

5. The coating composition of claim 1, wherein said one or more alcohol-functional wax or sterol has hydroxyl values in a range of 100-300 mg KOH/g.

6. The coating composition of claim 1, wherein said one or more alcohol-functional wax or sterol is a linear solid alkanol or alcohol-functional branched polyolefin.

7. The coating composition of claim 1, wherein said one or more hydrophobic wax material is a paraffin wax.

8. The coating composition of claim 1 having a viscosity between 50 and 2000 cP at 100 s$^{-1}$ at 25° C.

9. The coating composition of claim 1, wherein the amount of the one or more hydrophobic cycloaliphatic monomer is greater than 60 wt. %, the amount of the one or more alcohol-functional wax waxes or sterol is less than or equal to 5 wt. %, and the amount of the one or more hydrophobic wax material is less than or equal to 5 wt. % of the total weight of the composition.

10. The coating composition of claim 1 further comprising up to 40 wt. % of one or more of radiation curable monomer, oligomers, or resins other than said one or more hydrophobic cycloaliphatic monomer.

11. The coating composition of claim 1 further comprising one or more photoinitiator that initiates polymerization of the one or more radiation curable monomer in presence of ultraviolet light.

12. A printing process comprising printing the coating composition of claim 1 on to a paper or paperboard substrate.

13. The printing process of claim 12, wherein the printing process is flexographic.

14. The printing process of claim 12, wherein basis weight of the paper or paperboard substrate is in a range of 200-600 grams per square meter (gsm) and the paper or paperboard substrate has a smooth print receptive surface.

15. The printing process of claim 13, further comprising curing the printed coating composition by actinic radiation.

16. The printing process of claim 12, wherein printed coating weight is in a range of about 1 to 40 grams per square meter (gsm).

17. The printing process of claim 16, wherein the printed coating weight is about 4 to 12 gsm.

18. The printing process of claim 12, wherein the coating composition is printed in one pass through a printing press onto the paper or paperboard substrate and cured by actinic radiation.

19. The printing process of claim 12, wherein immediately after printing inks on the paper or paperboard substrate to form a printed image, the coating composition is overprinted onto the printed ink and print receptive surface of the paper or paperboard substrate all in one print pass or in multiple print passes.

20. The printing process of claim 19, wherein the inks are lithographic offset inks or flexographic inks.

21. The printing process of claim 12, wherein the coating composition is printed in two or more layers and the two or more printed layers are cured by actinic radiation after each print pass.

22. The printing process of claim 12, wherein the coating composition is printed in two or more layers during a single print pass by printing the coating composition in two layers using two flexographic printing units, wherein a first flexographic printing unit is placed in front of a second flexographic printing unit in-line on a printing press.

23. The printing process of claim 22, wherein the coating composition applied in two layers in-line is exposed to actinic radiation only after passing through the second flexographic printing unit.

24. A flexographic printing process wherein the coating composition of claim 1 is printed onto a print receptive surface of a substrate during one pass through a printing press, and the coating composition is printed onto an opposite side of the substrate during a separate pass through the printing press.

25. A printed substrate comprising the coating composition of claim 1.

26. The printed substrate of claim 25, wherein a printed area with a 100% level of coating coverage on a paper or paperboard substrate has a moisture vapor transmission rate (MVTR) that is reduced to less than 25% of a MVTR of an uncoated paper or paperboard substrate.

27. The printed substrate of claim 26, wherein the printed area with the 100% level of coating coverage on the paper or paperboard substrate has a MVTR that is reduced to less than 10% of the MVTR of the uncoated paper or paperboard substrate.

28. A process for manufacturing the coating composition of claim 1 comprising heating together the one or more hydrophobic cycloaliphatic monomer, the one or more alcohol-functional wax or sterol, and the one or more hydrophobic wax material to a temperature of up to 80° C. to facilitate blending and mixing of wax components into the coating composition.

* * * * *